(12) United States Patent
    Yu et al.

(10) Patent No.: US 12,649,346 B2
(45) Date of Patent: Jun. 9, 2026

(54) INTELLIGENT COLLABORATIVE OPERATION CONTROL STRATEGY FOR ELECTRO-HYDRAULIC SUSPENSION SYSTEM OF HIGH-HORSEPOWER TRACTOR

(71) Applicant: Nanjing Institute of Agricultural Mechanization, Ministry of Agriculture and Rural Affairs, Nanjing (CN)

(72) Inventors: Qingxu Yu, Nanjing (CN); Yan Gong, Nanjing (CN); Guangqiao Cao, Nanjing (CN); Chun Chang, Nanjing (CN); Xiao Chen, Nanjing (CN); Zhenwei Wang, Nanjing (CN); Jianling Hu, Nanjing (CN)

(73) Assignee: Nanjing Institute of Agricultural Mechanization, Ministry of Agriculture and Rural Affairs, Nanjing (CN)

( * ) Notice: Subject to any disclaimer, the term of this patent is extended or adjusted under 35 U.S.C. 154(b) by 0 days.

(21) Appl. No.: 19/287,207

(22) Filed: Jul. 31, 2025

(65) Prior Publication Data

US 2026/0070388 A1      Mar. 12, 2026

(30) Foreign Application Priority Data

Sep. 6, 2024    (CN) .......................... 202411245885.1

(51) Int. Cl.
    *G06F 18/26*        (2023.01)
    *B60G 17/0165*      (2006.01)
        (Continued)

(52) U.S. Cl.
    CPC ..... *B60G 17/0182* (2013.01); *B60G 17/0165* (2013.01); *B60G 17/019* (2013.01);
        (Continued)

(58) Field of Classification Search
    None
    See application file for complete search history.

(56) References Cited

U.S. PATENT DOCUMENTS 4,105,085 A  *  8/1978  van der Lely ....... B60K 7/0015
                                                        180/242

OTHER PUBLICATIONS

CNIPA, Notification of First Office Action for CN202411245885.1, Oct. 12, 2024.

(Continued)

*Primary Examiner* — Peter D Nolan
*Assistant Examiner* — Matthew Cobb
(74) *Attorney, Agent, or Firm* — Hemisphere Law, PLLC

(57)                ABSTRACT

An intelligent collaborative operation control strategy for an electro-hydraulic suspension system of a high-horsepower tractor is provided, including: S1, establishing an operation task database; S2, collecting information of the electro-hydraulic suspension system during an operation of the high-horsepower tractor in real time as real-time data; S3, preprocessing the real-time data; S4, analyzing a dataset and generating a preliminary control strategy for the electro-hydraulic suspension system based on parameters in the operation task database; S5, performing data interaction and collaborative control with operation units; S6, identifying deviations between operation status data and expected control parameters; S7, dynamically adjusting the preliminary control strategy. Through implementation of sensing technology and machine learning algorithms, real-time and precise adjustment of operation parameters for the suspension system of the tractor is achieved, significantly enhancing a level of automation and intelligence in operations, thereby effectively improving efficiency and economic benefits of agricultural operations.

7 Claims, 2 Drawing Sheets

(51) Int. Cl.

| | |
|---|---|
| *B60G 17/018* | (2006.01) |
| *B60G 17/019* | (2006.01) |
| *G06F 18/15* | (2023.01) |
| *G06F 18/21* | (2023.01) |
| *G06F 18/2137* | (2023.01) |
| *G06F 18/214* | (2023.01) |
| *G06F 18/2433* | (2023.01) |
| *G06F 18/25* | (2023.01) |
| *G06N 5/01* | (2023.01) |

(52) U.S. Cl.
CPC .......... *G06F 18/15* (2023.01); *G06F 18/2137* (2023.01); *G06F 18/214* (2023.01); *G06F 18/2178* (2023.01); *G06F 18/2433* (2023.01); *G06F 18/251* (2023.01); *G06F 18/26* (2023.01); *G06N 5/01* (2023.01); *B60G 2202/413* (2013.01); *B60G 2300/082* (2013.01); *B60G 2400/80* (2013.01); *B60G 2500/30* (2013.01); *B60G 2600/09* (2013.01); *B60G 2600/17* (2013.01); *B60G 2600/182* (2013.01); *B60G 2600/1871* (2013.01); *B60G 2600/70* (2013.01); *B60G 2800/16* (2013.01)

(56) References Cited

OTHER PUBLICATIONS

Nanjing Institute of Agricultural Mechanization, Ministry of Agriculture and Rural Affairs (Applicant), Replacement claims (allowed) of CN202411245885.1, Nov. 7, 2024.

CNIPA, Notification to grant patent right for invention in CN202411245885.1, Nov. 13, 2024.

* cited by examiner

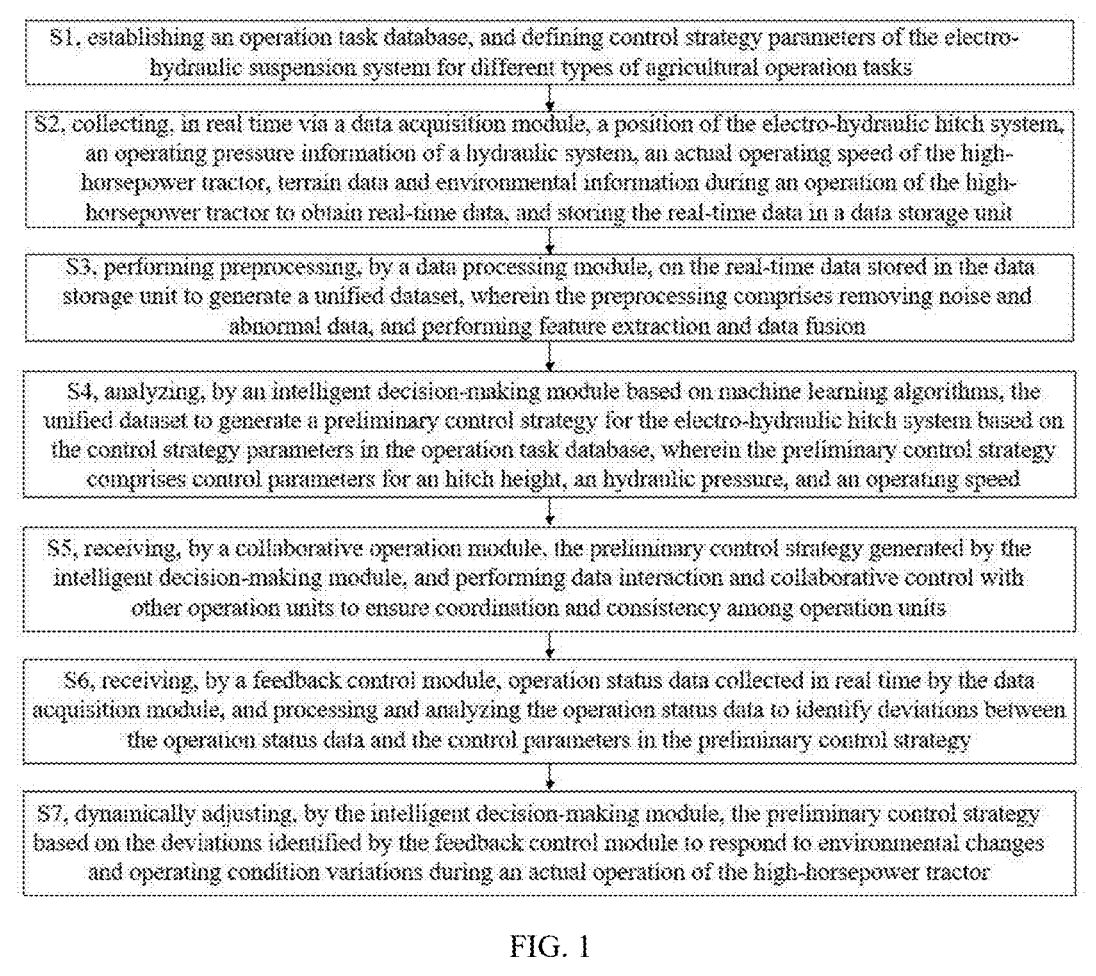

S1, establishing an operation task database, and defining control strategy parameters of the electro-hydraulic suspension system for different types of agricultural operation tasks S2, collecting, in real time via a data acquisition module, a position of the electro-hydraulic hitch system, an operating pressure information of a hydraulic system, an actual operating speed of the high-horsepower tractor, terrain data and environmental information during an operation of the high-horsepower tractor to obtain real-time data, and storing the real-time data in a data storage unit S3, performing preprocessing, by a data processing module, on the real-time data stored in the data storage unit to generate a unified dataset, wherein the preprocessing comprises removing noise and abnormal data, and performing feature extraction and data fusion S4, analyzing, by an intelligent decision-making module based on machine learning algorithms, the unified dataset to generate a preliminary control strategy for the electro-hydraulic hitch system based on the control strategy parameters in the operation task database, wherein the preliminary control strategy comprises control parameters for an hitch height, an hydraulic pressure, and an operating speed S5, receiving, by a collaborative operation module, the preliminary control strategy generated by the intelligent decision-making module, and performing data interaction and collaborative control with other operation units to ensure coordination and consistency among operation units S6, receiving, by a feedback control module, operation status data collected in real time by the data acquisition module, and processing and analyzing the operation status data to identify deviations between the operation status data and the control parameters in the preliminary control strategy S7, dynamically adjusting, by the intelligent decision-making module, the preliminary control strategy based on the deviations identified by the feedback control module to respond to environmental changes and operating condition variations during an actual operation of the high-horsepower tractor

FIG. 1

S71, receiving, by the intelligent decision-making module, deviation data calculated by the feedback control module, wherein the deviation data comprises a suspension height deviation, a hydraulic pressure deviation, and an operating speed deviation S72, analyzing, by the intelligent decision-making module, the deviation data to determine trends and potential causes of deviations S73, dynamically adjusting, by the intelligent decision-making module, the preliminary control strategy based on the trends and the potential causes of the deviations using an adaptive adjustment algorithm to obtain updated control parameters S74, transmitting the updated control parameters to the collaborative operation module and relevant operation units to ensure all of the operation units operating in accordance with an updated control strategy

FIG. 2

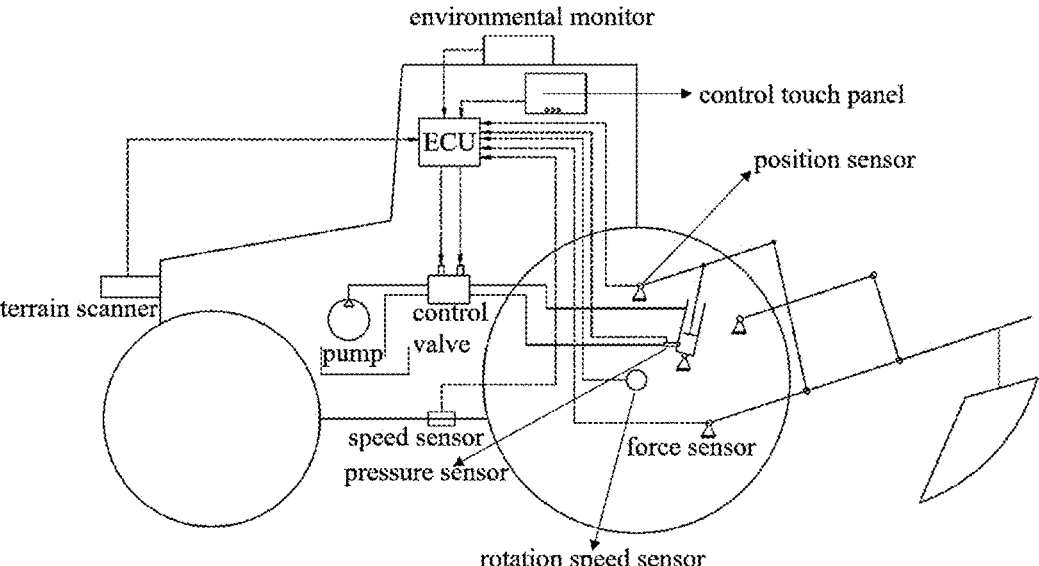

FIG. 3

INTELLIGENT COLLABORATIVE OPERATION CONTROL STRATEGY FOR ELECTRO-HYDRAULIC SUSPENSION SYSTEM OF HIGH-HORSEPOWER TRACTOR

CROSS-REFERENCE TO RELATED APPLICATION

This application claims priority to Chinese Patent Application No. 202411245885.1, filed on Sep. 6, 2024, which is herein incorporated by reference in its entirety.

TECHNICAL FIELD

The disclosure relates to the field of agricultural machinery technologies, and more particularly to an intelligent collaborative operation control strategy for an electro-hydraulic suspension system of a high-horsepower tractor.

BACKGROUND

In modern agricultural operations, efficiency and precision of high-horsepower tractors and their associated equipment directly impact operating costs and output quality. In particular, control strategies of electro-hydraulic suspension systems are crucial for achieving precision agriculture and improving operating efficiency. Traditional suspension control systems of tractors largely rely on operator's experience and manual adjustments. This not only increases complexity of operation but also makes it difficult to adapt to variable operating environments and soil conditions. For example, different operating tasks such as plowing, seeding, and harvesting have different requirements for suspension heights, hydraulic pressures, and operating speeds, requiring frequent and precise adjustments to adapt to different operating conditions.

In the related art, although there are some automated control solutions, these solutions often fail to adequately account for actual impact of environmental changes on operations, resulting in difficulties in ensuring the operating efficiency and quality. Moreover, current control systems often lack sufficient flexibility and adaptability and cannot respond in real time to changes in operating conditions, such as unevenness of terrain and fluctuations in soil moisture. These factors can all lead to differences in operating outcomes. Therefore, the control strategies for suspension control systems of tractors in the related art still present significant room for improvement in automation and intelligence.

SUMMARY

Based on the above purpose, the disclosure provides an intelligent collaborative operation control strategy for an electro-hydraulic suspension system of a high-horsepower tractor.

An intelligent collaborative operation control strategy for an electro-hydraulic suspension system of a high-horsepower tractor includes the following steps:

S1, establishing an operation task database, and defining control strategy parameters of the electro-hydraulic suspension system for different types of agricultural operation tasks in the operation task database;

S2, collecting, in real time via a data acquisition module, a position of the electro-hydraulic suspension system, an operating pressure of a hydraulic system, an actual operating speed of the high-horsepower tractor, terrain data and environmental information during an operation of the high-horsepower tractor to obtain real-time data, and storing the real-time data in a data storage unit;

S3, performing preprocessing, by a data processing module, on the real-time data stored in the data storage unit to generate a unified dataset, where the preprocessing includes removing noise and abnormal data, and performing feature extraction and data fusion;

S4, analyzing, by an intelligent decision-making module based on machine learning algorithms, the unified dataset to generate a preliminary control strategy for the electro-hydraulic suspension system based on the control strategy parameters in the operation task database, where the preliminary control strategy includes control parameters for a suspension height, a hydraulic pressure, and an operating speed;

S5, receiving, by a collaborative operation module, the preliminary control strategy generated by the intelligent decision-making module, and performing data interaction and collaborative control with operation units to ensure coordination and consistency among the operation units;

S6, receiving, by a feedback control module, operation status data collected in real time by the data acquisition module, and processing and analyzing the operation status data to identify deviations between the operation status data and the control parameters in the preliminary control strategy; and S7, dynamically adjusting, by the intelligent decision-making module, the preliminary control strategy based on the deviations identified by the feedback control module to obtain an updated control strategy, so as to respond to environmental changes and operating condition variations during an actual operation of the high-horsepower tractor.

In an embodiment, the intelligent collaborative operation control strategy for the electro-hydraulic suspension system of the high-horsepower tractor further includes: controlling the electro-hydraulic suspension system to operate based on updated control parameters in the updated control strategy determined in the step S7, thereby enhancing operating efficiency and accuracy of the high-horsepower tractor.

In an embodiment, the step S1 includes the following steps:

S11, classifying agricultural operation tasks into different types to obtain the different types of agricultural operation tasks, the different types of agricultural including plowing operation tasks, seeding operation tasks, and harvesting operation tasks;

S12, for each agricultural operation task, collecting relevant operation parameters and historical data, and organizing and standardizing the relevant operation parameters and the historical data to form the operation task database, where the operation parameters and the historical data include terrain characteristics, soil types, operating depths, operating speeds, and implement information;

S13, using, based on the historical data and the relevant operation parameters, statistical analysis and machine learning algorithms to determine the control strategy parameters of the electro-hydraulic suspension system for the different types of agricultural operation tasks, where the control strategy parameters include parameters for suspension heights, hydraulic pressures, and operating speeds; and S14, storing the control strategy parameters in the operation task database, and establishing a correspondence between the control strategy parameters and different types of agricultural operation tasks for use during the actual operation of the high-horsepower tractor.

In an embodiment, the step S2 includes the following steps:

S21, configuring the data acquisition module, the data acquisition module including multiple sensors, where the multiple sensors include a position sensor, a pressure sensor, a speed sensor, a terrain scanner, and an environmental monitor; the position sensor is configured to monitor the position of the electro-hydraulic suspension system in real time; the pressure sensor is configured to monitor the operating pressure of the hydraulic system; the speed sensor is configured to record the actual operating speed of the high-horsepower tractor; the terrain scanner is configured to obtain the terrain data of a current operating region; and the environmental monitor is configured to collect the environmental information including a temperature and a humidity;

S22, transmitting, in real time via a data acquisition unit of the data acquisition module, data collected by the multiple sensors to a central processing unit, where the central processing unit is configured to perform initial time-stamping and classification processing on the data collected by the multiple sensors;

S23, implementing a data filtering algorithm during a data acquisition process to remove noise or abnormal data from the data collected by the multiple sensors, where the data filtering algorithm includes signal smoothing, outlier detection, and data normalization;

S24, storing data, after performing preliminary processing and verification, as the real-time data in the data storage unit; and S25, establishing a data index for the real-time data, where each data item of the real-time data is marked with a unique index and a corresponding operation task label, thereby enabling association of the data item with a corresponding agricultural operation task.

In an embodiment, the step S3 includes the following steps:

S31, extracting the real-time data from the data storage unit, where the real-time data includes the position of the electro-hydraulic suspension system, the operating pressure of the hydraulic system, the actual operating speed of the high-horsepower tractor, the terrain data and the environmental information;

S32, applying a data cleaning algorithm to the real-time data to remove the noise and the abnormal data, thereby obtaining cleaned data, including:

using a median filtering algorithm and a mean filtering algorithm to smooth the real-time data and eliminate instantaneous noise; and using a statistical analysis method to detect and remove the abnormal data;

S33, performing the feature extraction by analyzing the cleaned data to obtain features, where the features include a displacement change rate of the electro-hydraulic suspension system, a pressure fluctuation range of the hydraulic system, an instantaneous speed and an acceleration of the high-horsepower tractor, a terrain slope and a surface roughness, and variation trends of environmental temperature and humidity;

S34, performing the data fusion, including:

using a Kalman filtering algorithm to fuse multi-sensor data including the features obtained in the step S33 to obtain multi-dimensional feature data; and performing dimensionality reduction on the multi-dimensional feature data to reduce redundant data, thereby to form a comprehensive feature dataset; and S35, storing the comprehensive feature dataset in the data storage unit, and tagging the comprehensive feature dataset with a timestamp and a task label, thereby generating the unified dataset.

In an embodiment, the step S4 includes:

S41, receiving, by the intelligent decision-making module, the unified dataset;

S42, matching the unified dataset with the control strategy parameters in the operation task database to generate a matched dataset, thereby generating a target agricultural operation task;

S43, analyzing the matched dataset based on a random forest-based machine learning algorithm to determine target control parameters for the electro-hydraulic suspension system consistent with current operating conditions of the high-horsepower tractor; and S44, generating the preliminary control strategy for the electro-hydraulic suspension system based on the target control parameters, where the preliminary control strategy includes the control parameters for the suspension height, the hydraulic pressure, and the operating speed to adapt to the current operating conditions of the high-horsepower tractor.

In an embodiment, the step S42 includes:

S421, performing an initial match between the unified dataset and the control strategy parameters in the operation task database;

S422, calculating a different value between each parameter in the unified dataset and a corresponding control strategy parameter of the control strategy parameters in the operation task database as the following formula:

$$D_{ij} = |P_i - T_j|$$

where $D_{ij}$ represents a different value between an i-th parameter in the unified dataset and a j-th control strategy parameter of the control strategy parameters in the operation task dataset, $P_i$ represents a value of the i-th parameter in the unified dataset, and $T_j$ represents a value of the j-th control strategy parameter of the control strategy parameters in the operation task dataset;

S423, calculating a total difference for each of the different types of agricultural operation tasks to determine the target agricultural operation task as per the following formula:

$$D_j = \sum_{i=1}^{n} D_{ij}$$

where $D_j$ represents a total difference for a j-th agricultural operation task of the different types of agricultural operation tasks, and n represents a total number of the control strategy parameters of each of the different types of agricultural operation tasks;

S424, selecting an agricultural operation task with a minimum total difference from the different types of agricultural operation tasks as the target agricultural operation task as per the following formula:

$$j_{best} = \mathrm{argmin}_j\{D_j\}$$ (5)

where $j_{best}$ represents an index of the target agricultural operation task with the minimum total difference $D_j$, and argmin represents a minimum value function; and
S425, using the control strategy parameters of the target agricultural operation task corresponding to the matched dataset as the preliminary control parameters.
In an embodiment, the step S43 includes the following steps:
S431, constructing a training dataset including historical operating data and corresponding control parameters, where the training dataset includes suspension heights, hydraulic pressures, operating speeds, and corresponding environmental conditions and operation results;
S432, training a random forest model using the training dataset to obtain a trained random forest model, where the random forest model consists of multiple decision trees, and each of the multiple decision trees is constructed as per the following formula:

$$\mathrm{Tree}(X) = \sum_{i=1}^{n} w_i \cdot h_i(X)$$

where Tree(X) represents a decision tree model, X represents an input feature vector, $h_i(X)$ represents a i-th decision tree, $w_i$ represents a corresponding weight, of the i-th decision tree and n represents a number of the multiple decision trees;
S433, inputting the matched dataset obtained in the step S42 into the trained random forest model for prediction, outputting, by the trained random forest model, the target control parameters by integrating prediction results from all the multiple decision trees as per the following formula:

$$\hat{Y} = \frac{1}{N} \sum_{j=1}^{N} \mathrm{Tree}_j(X)$$

where $\hat{Y}$ represents a predicted target control parameter vector, N represents a total number of the multiple decision trees, $\mathrm{Tree}_j(X)$ represents a prediction result of a j-th decision tree of the multiple decision trees; and
S434, generating, by the trained random forest model, the control parameters for the electro-hydraulic suspension system based on the matched database, where the control parameters include the suspension height, the hydraulic pressure, and the operating speed.
In an embodiment, the step S5 includes the following steps:
S51, receiving, by the cooperative operation module, the preliminary control strategy generated by the intelligent decision-making module, where the preliminary control strategy includes the control parameters for the suspension height $\hat{H}$, the hydraulic pressure $\hat{P}$, and the operating speed $\hat{V}$;
S52, transmitting the preliminary control strategy to the operation units via an internal bus, where the operation units include a plowing unit and a seeding unit;

S53, receiving, by each of the operation units, the preliminary control strategy, and adjusting operation statuses of the operation units based on the control parameters of the preliminary control strategy;
S54, monitoring, by sensors of the cooperative operation module, the operation statuses and feedback data of the operation units in real time, where the feedback data includes an actual plowing depth and an actual seeding speed;
S55, aggregating, by the cooperative operation module, the feedback data from the operation units to obtain aggregate data, and comparing the aggregate data with the preliminary control strategy to adjust the preliminary control strategy through a built-in cooperative optimization algorithm to obtain an adjusted control strategy, thereby ensuring the coordination and the consistency among the operation units; and
S56, dynamically adjusting operation parameters of each of the operation units based on the adjusted control strategy to ensure the coordination and the consistency among the operation units during the cooperative operation.
In an embodiment, the step S6 includes the following steps:
S61, receiving, by the feedback control module, the operation status data collected in real time by the data acquisition module, where the operation status data includes a suspension height $H_{actual}$, a pressure of the hydraulic system $P_{actual}$, and an operating speed $V_{actual}$;
S62, performing preliminary processing, by the feedback control module, on the operation status data to obtain preliminarily preprocessed actual operation status data, where the preliminary processing includes data filtering, noise reduction, and data calibration; and
S63, comparing the preliminarily preprocessed actual operation status data with the expected control parameters in the preliminary control strategy generated by the intelligent decision-making module, to identify deviations between the preliminarily preprocessed actual operation status data and the expected control parameters;
where a suspension height deviation $\Delta H$ is calculated as per the following formula:

$$\Delta H = H_{expected} - H_{actual}$$

where $H_{expected}$ represents an expected suspension height generated by the intelligent decision-making module, $H_{actual}$ represents an actual suspension height;
where a hydraulic pressure deviation $\Delta P$ is calculated as per the following formula:

$$\Delta P = P_{expected} - P_{actual}$$

where $P_{expected}$ represents an expected hydraulic pressure generated by the intelligent decision-making module, $P_{actual}$ represents an actual hydraulic pressure;
where an operating speed deviation $\Delta V$ is calculated as per the following formula:

$$\Delta V = V_{expected} - V_{actual}$$

where $V_{expected}$ represents an expected operating speed generated by the intelligent decision-making module, $V_{actual}$ represents an actual operating speed.

In an embodiment, the step S7 includes the following steps:

S71, receiving, by the intelligent decision-making module, deviation data calculated by the feedback control module, where the deviation data includes a suspension height deviation, a hydraulic pressure deviation, and an operating speed deviation;

S72, analyzing, by the intelligent decision-making module, the deviation data to determine trends and potential causes of deviations;

S73, dynamically adjusting, by the intelligent decision-making module, the preliminary control strategy based on the trends and the potential causes of the deviations using an adaptive adjustment algorithm to obtain the updated control parameters, including:

in response to a corresponding deviation of the deviations being a persistent deviation, adjusting, by the intelligent decision-making module, a corresponding control parameter to reduce the corresponding deviation of the deviations;

in response to the deviation of the deviations being a temporary deviation, monitoring and recording, by the intelligent decision-making module, the corresponding deviation of the deviations without immediately adjusting the corresponding control parameter;

where the dynamically adjusting is performed by using a proportional-integral-derivative (PID) control algorithm to perform parameter correction, including:

adjusting the suspension height as per the following formula to obtain an updated suspension height:

$$H_{new} = H_{expected} + K_p \cdot \Delta H + K_i \cdot \int \Delta H dt + K_d \frac{d\Delta H}{dt}$$

where $H_{new}$ represents the updated suspension height, $H_{expected}$ represents an expected suspension height generated by the intelligent decision-making module, $\Delta H$ represents the suspension height deviation, t represents a time variable, and $K_p$, $K_i$ and $K_d$ represents a proportional coefficient, an integral coefficient and a derivative coefficient of the PID controller, respectively;

adjusting the hydraulic pressure as per the following formula to obtain an updated hydraulic pressure:

$$P_{new} = P_{expected} + K_p \cdot \Delta P + K_i \cdot \int \Delta P dt + K_d \frac{d\Delta P}{dt}$$

where $P_{new}$ represents the updated hydraulic pressure, $P_{expected}$ represents an expected hydraulic pressure generated by the intelligent decision-making module, $\Delta P$ represents the hydraulic pressure deviation;

adjusting the operating speed as per the following formula to obtain an updated operating speed:

$$V_{new} = V_{expected} + K_p \cdot \Delta V + K_i \cdot \int \Delta V dt + K_d \frac{d\Delta V}{dt}$$

where $V_{new}$ represents the updated operating speed, $V_{expected}$ represents an expected operating speed generated by the intelligent decision-making module, $\Delta V$ represents the operating speed deviation; and S74, transmitting the updated control parameters to the collaborative operation module and relevant operation units to ensure all of the operation units operating in accordance with the updated control strategy.

The disclosure may achieve the following beneficial effects.

The disclosure, by implementing advanced sensing technology and machine learning algorithms, enables real-time and precise monitoring and adjustment of the operation parameters of the electro-hydraulic suspension system, such as the suspension height, the hydraulic pressure, and the operating speed, ensuring that these parameters are always adapted to the current operating conditions. This fine control significantly enhances the accuracy and efficiency of the operation, reduces dependence on the operator, minimizes errors and resource wastage caused by improper operation, and markedly improves the level of automation and intelligence in agricultural machinery operations.

The disclosure, through a feedback adjustment mechanism, is capable of dynamically adjusting the control strategy based on the real-time data collected during the operation process to adapt to changes in the operating environment. This not only enhances the adaptability of the operation but also further optimizes the use of resources, such as savings in fuel and time. By integrating these technologies, the disclosure ensures that the tractor maintains optimal performance under various operating conditions, thereby improving the economic efficiency and sustainability of an entire agricultural production process.

BRIEF DESCRIPTION OF DRAWINGS

To more clearly illustrate technical solutions of the disclosure or the related art, a brief description will be provided below of attached drawings required for description of embodiments or the related art. It is apparent that the attached drawings described below are merely illustrative of the disclosure. Those skilled in the art may also obtain other attached drawings based on these attached drawings without creative effort.

FIG. 1 illustrates a schematic diagram of an intelligent collaborative operation control strategy for an electro-hydraulic suspension system of a high-horsepower tractor according to an embodiment of the disclosure.

FIG. 2 illustrates a schematic diagram of a dynamic adjustment process of a control strategy according to the embodiment of the disclosure.

FIG. 3 illustrates a schematic diagram of mounting positions of sensors according to the embodiment of the disclosure.

DETAILED DESCRIPTION OF EMBODIMENTS

The disclosure will be described in detail below with reference to attached drawings and specific embodiments. At the same time, it should be noted that in order to make embodiments more detailed, the following embodiments are presented as the specific embodiments. For some well-known technologies, those skilled in the art may also adopt other alternative approaches for implementation. Moreover, the attached drawings are provided solely to more specifically describe the embodiments and are not intended to limit the disclosure in any way.

It should be noted that references in the specification to phrases such as "an embodiment", "embodiments", "an illustrative embodiment", "some embodiments", or the like indicate that described embodiments may include a particular feature, structure, or characteristic. However, not every embodiment necessarily includes that particular feature, structure, or characteristic. Moreover, when a particular feature, structure, or characteristic is described in connection with an embodiment, it is within the knowledge of those skilled in the relevant art to affect such feature, structure, or characteristic in connection with other embodiments, whether or not explicitly described.

Usually, terms can be understood at least in part from the context in which they are used. For example, depending at least in part on the context, the term "one or more" as used herein can refer to any single feature, structure, or characteristic, or to a combination of features, structures, or characteristics in the plural sense. In addition, the term "based on" can be understood not necessarily to convey an exclusive set of factors, but rather, depending at least in part on the context, to allow for the presence of additional factors that are not explicitly described.

As shown in FIGS. 1-3, the disclosure provides an intelligent collaborative operation control strategy for an electro-hydraulic suspension system of a high-horsepower tractor, which includes the following steps S1 through S7. The intelligent collaborative operation control strategy provided by the disclosure specifically focuses on adjustment of a three-point hitch system (also referred to as three-point linkage) at a rear end of the high-horsepower tractor. The high-horsepower tractor is defined as a tractor with an engine power of 100 horsepower (approximately 73.5 kilowatts (kW)) or above.

In the step S1, an operation task database is established. For different types of agricultural operation tasks in the operation task database (such as plowing, seeding, and harvesting), control strategy parameters of the electro-hydraulic suspension system are defined, and the control strategy parameters includes suspension heights, hydraulic pressures, and operating speeds.

In the step S2, via a data acquisition module, a position of the electro-hydraulic suspension system, an operating pressure of a hydraulic system, an actual operating speed of the high-horsepower tractor, terrain data, and environmental information during an operation of the high-horsepower tractor are collected in real time as real-time data, and the real-time data are stored in a data storage unit. Specifically, the data acquisition module is primarily based on hardware components, complemented by embedded software. The data acquisition module includes a variety of sensors (such as a position sensor, a pressure sensor, a speed sensor, a terrain scanner, and an environmental monitor) and a data acquisition device (such as an analog-to-digital (AD) converter and an embedded acquisition unit). The data storage unit is primarily based on hardware devices (storage media) and further requires support from system-level software. The data storage unit includes non-volatile storage media (such as solid state drive (SSD) and embedded Flash memory) and a file system management module. Moreover, the data storage unit is configured to store sensor data, control parameters, task libraries, training datasets, etc., and requires support from an operating system level and a data indexing mechanism.

In the step S3, preprocessing is performed by a data processing module on the real-time data stored in the data storage unit to generate a unified dataset. The preprocessing includes removing noise and abnormal data, and performing feature extraction and data fusion. Specifically, the data processing module is a software module that runs on a central processing unit or an edge computing device. The data processing module performs operations such as data cleaning, filtering, feature extraction, Kalman fusion, and data dimensionality reduction. It can be deployed on a computing platform or an industrial control host on the high-horsepower tractor.

In the step S4, the unified dataset is analyzed by an intelligent decision-making module based on machine learning algorithms to generate a preliminary control strategy for the electro-hydraulic suspension system based on the control strategy parameters in the operation task database. The preliminary control strategy includes specific control parameters for a suspension height, a hydraulic pressure, and an operating speed. Specifically, the intelligent decision-making module is software configured to be stored in at least one memory and executable by at least one processor coupled to the at least one memory. The intelligent decision-making module performs tasks such as operation task matching, random forest prediction, and PID control.

In the step S5, the preliminary control strategy generated by the intelligent decision-making module is received by a collaborative operation module. Data interaction and cooperative control are performed with operation units (including a plowing unit and a seeding unit) to ensure coordination and consistency among the operation units, thereby improving overall operating efficiency. Specifically, the collaborative operation module is a module that integrates both a software component and a hardware component. The hardware component includes controller area network (CAN) buses or industrial Ethernet interfaces for communication with the operation units. The software component encompasses software logic for task distribution, status monitoring, and coordination control strategies. The collaborative operation module achieves synchronized operation and consistency among different modules by leveraging sensor feedback and task distribution mechanisms. The plowing unit and the seeding unit both are primarily based on hardware devices and further requires support from system-level software.

In the step S6, operation status data collected in real time by the data acquisition module is received by a feedback control module. The operation status data is then processed and analyzed to identify deviations between the operation status data and the specific control parameters in the preliminary control strategy. Specifically, the feedback control module is a software, which can be embedded in controller firmware or an operating system task. The feedback control is responsible for acquiring real-time feedback data, calculating deviations, executing PID closed-loop control logic, and outputting adjustment commands.

In the step S7, the preliminary control strategy is dynamically adjusted by the intelligent decision-making module based on the deviations identified by the feedback control module, so as to respond to potential environmental changes and operating condition variations during an actual operation of the high-horsepower tractor, thereby ensuring optimal performance and stable operation of the electro-hydraulic suspension system.

The operation task database is established in step S1, including the following steps S11 through S14.

In the step S11, agricultural operation tasks are classified into different types to obtain the different types of agricultural operation tasks. The different types of agricultural operation tasks include plowing operation tasks, seeding operation tasks, and harvesting operation tasks, each of which has specific operating requirements and environmental characteristics.

In the step S12, for each agricultural operation task, relevant operation parameters and historical data are collected. The operation parameters and the historical data include terrain characteristics, soil types, operating depths, operating speeds, and implement information. Then the relevant operation parameters and the historical data are then organized and standardized to form the operation task database for analysis.

In the step S13, based on the historical data and the relevant operation parameters, the control strategy parameters of the electro-hydraulic suspension system for the different types of agricultural operation tasks are determined by using statistical analysis and machine learning algorithms. The control strategy parameters include parameters for suspension heights, hydraulic pressures, and operating speeds. The suspension height is determined based on requirements of the different types of agricultural operation tasks, and an optimal height of the electro-hydraulic suspension system is determined to ensure optimal contact between an implement and a ground surface. The hydraulic pressure is determined by integrating soil types and terrain characteristics, and an optimal pressure of the hydraulic system is determined to provide sufficient support force and cushioning effect. The operating speed is determined based on nature of the different types of agricultural operation tasks and ground conditions, and an optimal operating speed of the high-horsepower tractor is determined to achieve efficient operation and reduce energy consumption.

In the step S14, the control strategy parameters are stored in the operation task database, and a correspondence between the control strategy parameters and the different types of agricultural operation tasks is established for use during the actual operation of the high-horsepower tractor. Through the operation task database established by the above steps, the high-horsepower tractor is enabled to adjust operation parameters of the electro-hydraulic suspension system in real time based on the historical data and the control strategy parameters when performing the different types of agricultural operation tasks. In this way, operating efficiency and quality are improved, energy consumption and mechanical wear are reduced, and system adaptability and stability are enhanced.

The step S2 includes the following steps S21 through S25.

In the step S21, the data acquisition module is configured with multiple sensors. The sensors include a position sensor, a pressure sensor, a speed sensor, a terrain scanner, and an environmental monitor. The position sensor is configured to monitor the position of the electro-hydraulic suspension system in real time. The pressure sensor is configured to monitor the operating pressure of the hydraulic system. The speed sensor is configured to record the actual operating speed of the high-horsepower tractor. The terrain scanner is configured to obtain the terrain data of a current operating region. The environmental monitor is configured to collect the environmental information including a temperature and a humidity.

In the step S22, data collected by the multiple sensors is transmitted in real-time to a central processing unit of the data acquisition module via a data acquisition unit of the data acquisition module. The central processing unit is configured to perform initial time-stamping and classification processing on the data collected by the multiple sensors.

In the step S23, during a data acquisition process, a data filtering algorithm is applied to remove potential noise or abnormal data from the data collected by the multiple sensors, thereby ensuring data accuracy and reliability. The filtering algorithm includes signal smoothing, outlier detection, and data normalization.

In the step S24, data, after performing preliminary processing and verification, is stored in the data storage unit as real-time data. The data storage unit utilizes a high-efficiency database. This database supports high-speed data writing and querying operations, and includes data backup and recovery functions to ensure data security and integrity of the data during operation.

In the step S25, a data index for the real-time data is established to optimize data retrieval efficiency and facilitate future data analysis. Each data item of the real-time data is marked with a unique index and a corresponding operation task label, thereby enabling rapid association of the data item with a corresponding agricultural operation task. Through the above steps, the data acquisition module is capable of efficiently and accurately collecting and storing key data (i.e., the real-time data) during the operation of the high-horsepower tractor. The key data includes the position of the electro-hydraulic suspension system, the operating pressure of the hydraulic system, the actual operating speed of the high-horsepower tractor, the terrain data, and the environmental information. The real-time acquisition and storage of the key data not only provide precise input for the intelligent decision-making module, but also optimize execution of the agricultural operation tasks, improve operating efficiency, and reduce potential operating errors, thereby enhancing overall performance and reliability of the electro-hydraulic suspension system.

The preprocessing in the step S3 specifically includes the following steps S31 through S35.

In the step S31, the real-time data is extracted from the data storage unit. The real-time data includes the position of the electro-hydraulic suspension system, the operating pressure of the hydraulic system, the actual operating speed of the high-horsepower tractor, the terrain data and the environmental information.

In the step S32, a data cleaning algorithm is applied to the real-time data to remove the noise and the abnormal data, thereby obtaining cleaned data. Specifically, a median filtering algorithm and a mean filtering algorithm are used to smooth the real-time data and eliminate instantaneous noise. In addition, a statistical analysis method, such as a Z-Score method, is used to detect and remove the abnormal data, thereby ensuring data accuracy and consistency.

In the step S33, the feature extraction is performed by analyzing the cleaned data to obtain features. The features include a displacement change rate of the electro-hydraulic suspension system, a pressure fluctuation range of the hydraulic system, an instantaneous speed and an acceleration of the high-horsepower tractor, a terrain slope and a surface roughness, and variation trends of environmental temperature and humidity.

In the step S34, the data fusion is performed. Specifically, a Kalman filtering algorithm is used to fuse multi-sensor data to obtain multi-dimensional feature data. In addition, the dimensionality reduction is performed on multi-dimensional feature data to reduce redundant data, thereby to form a comprehensive feature dataset. Specifically, the multi-sensor data includes the features obtained in the step S33.

In the step S35, the unified dataset is generated. Specifically, the comprehensive feature dataset is stored in the data storage unit, and the comprehensive feature dataset is tagged with a timestamp and a task label to ensure data traceability and associability, thereby generating the unified dataset. Data verification and consistency checking on the unified dataset to ensure integrity and accuracy of the unified dataset, in preparation for use by the intelligent decision-making module. Through the above steps, the real-time data stored in the data storage unit is preprocessed, including removing the noise and the abnormal data, and performing feature extraction and data fusion to generate the unified dataset. This process not only improves the data quality and reliability, but also enhances efficiency of data analysis and processing, provides high-quality input data for the intelligent decision-making module, thereby significantly improving the accuracy of the control strategy of the electro-hydraulic suspension system and operating efficiency, and ensuring optimal performance and stable operation of the electro-hydraulic suspension system under various operating conditions.

The step S4 specifically includes the following steps S41 through S44.

In the step S41, the unified dataset is received by the intelligent decision-making module. The unified dataset includes key features (i.e., the features in step S33) such as the displacement change rate of the electro-hydraulic suspension system, the pressure fluctuation range of the hydraulic system, and a speed variation of the high-horsepower tractor (i.e., instantaneous speed and the acceleration of the high-horsepower tractor).

In the step S42, the unified dataset is matched with the control strategy parameters in the operation task dataset to generate a matched dataset corresponding to current operating conditions, thereby generating a target agricultural operation task. The matched dataset is used for prediction by the intelligent decision-making module. The strategy control parameters required for the different types of agricultural operation tasks (such as plowing, seeding, harvesting) are predefined in the operation task dataset, including the suspension heights, the hydraulic pressures, and the operating speeds.

In the step S43, the matched dataset is analyzed based on a random forest-based machine learning algorithm to determine target control parameters for the electro-hydraulic suspension system consistent with current operating conditions of the high-horsepower tractor. The random forest constructs multiple decision trees and combines their outputs to improve prediction accuracy and robustness.

In the step S44, based on the target control parameters, the preliminary control strategy for the electro-hydraulic suspension system is generated. The preliminary control strategy includes the control parameters for the suspension height, the hydraulic pressure, and the operating speed to optimally adapt to the current operating conditions of the high-horsepower tractor. Through the above steps, the intelligent decision-making module automatically generates the preliminary control strategy for the electro-hydraulic suspension system adapted to the current operating conditions of the high-horsepower tractor, based on accurate and comprehensive data analysis combined with the control strategy parameters in the operation task dataset. By using advanced machine learning techniques, this method ensures high precision of the preliminary control strategy and optimization of the operation, significantly improving operating efficiency and safety, reducing energy consumption and mechanical wear, and enhancing overall system performance and reliability.

The step S42 specifically includes the following steps S421 through S425.

In the step S421, the unified dataset is initially matched with the control strategy parameters in the operation task database. The operation task database contains ideal parameter ranges for the suspension heights, the hydraulic pressures, and the operating speeds for the different types of agricultural operation tasks.

In the step S422, a difference value between each parameter in the unified dataset and a corresponding control strategy parameter of the control strategy parameters in the operation task database is calculated as per the formula: $D_{ij}=|P_i-T_j|$, where $D_{ij}$ represents a difference value between an i-th parameter in the unified dataset and a j-th control strategy parameter of the control strategy parameters in the operation task dataset, $P_i$ represents a value of the i-th parameter in the unified dataset, and $T_j$ represents a value of the j-th control strategy parameter of the control strategy parameters in the operation task dataset.

In the step S423, a total difference for each of the different types of agricultural operation tasks is calculated to determine a best-matched agricultural operation task (i.e., the target agricultural operation task) as per the formula:

$$D_j = \sum_{i=1}^{n} D_{ij},$$

where $D_j$ represents a total difference for a j-th agricultural operation task of the different types of agricultural operation tasks, and n represents a total number of the control strategy parameters of each of the different types of agricultural operation tasks.

In the step S424, an agricultural operation task with a minimum total difference is selected from the different types of agricultural operation tasks as the target agricultural operation task as per the formula: $j_{best}=\text{argmin}_j\{D_j\}$, where $j_{best}$ represents an index of the target agricultural operation task, i.e., the agricultural operation task with the minimum total difference, and argmin represents a minimum value function.

In the step S425, the control strategy parameters of the target agricultural operation task corresponding to the matched dataset are used as the preliminary control parameters, including the suspension height, the hydraulic pressure, and the operating speed, and are utilized for subsequent intelligent decision-making analysis. Through the above steps, the unified dataset is accurately matched with the control strategy parameters in the operation task database, thereby selecting the control strategy parameters most suitable for the current operating conditions of the high-horsepower tractor. By calculating different values between individual parameters and comprehensively evaluating the total difference value, the accuracy and reliability of the matching process are ensured. This not only improves the efficiency of preliminary control strategy generation but also ensures operating precision and stability, thereby further enhancing the operating performance and overall reliability of the high-horsepower tractor.

The step S43 specifically includes the following steps S431 through S434.

In the step S431, a training dataset is constructed, including historical operating data and corresponding control parameters. The training dataset includes suspension heights (H), hydraulic pressure (P), operating speed (V), and corresponding environmental conditions and operation results.

In the step S432, a random forest model is trained using the training dataset to obtain a trained random forest model.

The random forest model consists of multiple decision trees. Each of the multiple decision trees is constructed as per the following formula:

$$\text{Tree}(X) = \sum_{i=1}^{n} w_i \cdot h_i(X),$$

where Tree(X) represents a decision tree model, X represents an input feature vector (including parameters such as H, P, V), $h_i(X)$ represents an i-th decision tree, $w_i$ represents a corresponding weight of the i-th decision tree, and n represents a number of the multiple decision trees.

In the step S433, the matched dataset obtained from the step S42 is input into the trained random forest model for prediction. The trained random forest model integrates prediction results from all the multiple decision trees and outputs the target control parameters. The specific formula is:

$$\hat{Y} = \frac{1}{N} \sum_{j=1}^{N} \text{Tree}_j(X),$$

where $\hat{Y}$ represents a predicted optimal control parameter vector (including a predicted suspension height, a predicted hydraulic pressure, and a predicted operating speed), N represents a total number of the multiple decision trees, and $\text{Tree}_j(X)$ represents a prediction result of a j-th decision tree of the multiple decision trees.

In the step S434, control parameters for the electro-hydraulic suspension system are generated by the random forest model based on the matched dataset. The control parameters include the suspension height, the hydraulic pressure, and the operating speed. The random forest model improves prediction accuracy and robustness by integrating the results of multiple decision trees. Through the above steps, the random forest-based machine learning algorithm performs in-depth analysis of the matched dataset. Accurate prediction of the control parameters for the electro-hydraulic suspension system most suitable for the current operating conditions of the high-horsepower is achieved. The random forest algorithm enhances prediction accuracy and system robustness by integrating the multiple decision trees. The effectiveness and applicability of the control strategy are ensured. Operation efficiency and quality are optimized. Energy consumption and mechanical wear are reduced. Overall performance and reliability of the high-horsepower tractor are improved.

The step S5 specifically includes the following steps S51 through S56.

In the step S51, the preliminary control strategy generated by the intelligent decision-making module is received by the cooperative operation module. The preliminary control strategy includes the control parameters for the suspension height $\hat{H}$, the hydraulic pressure $\hat{P}$, and the operating speed $\hat{V}$.

In the step S52, the preliminary control strategy is transmitted to the operation units via an internal bus. The operation units include the plowing unit and the seeding unit. The transmission is performed using a CAN protocol thereby ensuring real-time performance and reliability of data transmission.

In the step S53, the preliminary control strategy is received by each of the operation units. Operation statuses of the operation units are adjusted based on the control parameters of the preliminary control strategy. The plowing unit adjusts its depth control and force control to match the suspension height and the hydraulic pressure. The seeding unit adjusts its seed release speed and position control to match the operating speed.

In the step S54, the operation statues and feedback data of the operation units are monitored in real time by sensors of the cooperative operation module. The feedback data includes an actual plowing depth and an actual seeding speed.

In the step S55, the feedback data from the operation units is aggregated by the cooperative operation module to obtain aggregate data. The aggregate data is compared with the preliminary control strategy to adjust the preliminary control strategy through a built-in cooperative optimization algorithm to obtain an adjusted control strategy. Coordination and consistency among the operation units are ensured. The cooperative optimization algorithm is implemented through the following steps S551 through S553.

In the step S551, an objective function F is defined. The objective function includes performance indicators of all operation units, and an expression of the objective function is as that:

$$F = \sum_{i=1}^{m} \alpha_i \cdot f_i(x),$$

where $f_i(x)$ represents a performance function of an i-th operation unit, $\alpha_i$ represents a corresponding weight coefficient, m represents total number of operation units, and x represents a control parameter vector, including $\hat{H}$, $\hat{P}$, and $\hat{V}$.

In the step S552, the objective function F is optimized using a gradient $\nabla F$ descent method. A gradient is calculated as per a formula as that:

$$\nabla F = \left( \frac{\partial F}{\partial \hat{H}}, \frac{\partial F}{\partial \hat{P}}, \frac{\partial F}{\partial \hat{V}} \right).$$

In the step S553, based on the gradient $\nabla F$, the control parameter vector x is updated as per a formula as that: $x_{new} = x - \eta$, where $\eta$ represents a learning rate, and $x_{new}$ represents an updated control parameter vector.

In the step S56, based on the adjusted control strategy, operation parameters of each of the operation units are dynamically adjusted. Coordination and consistency among the operation units in the cooperative operation are ensured. Through the above steps, the cooperative operation module effectively receives the preliminary control strategy generated by the intelligent decision-making module. Data interaction and cooperative control with the operation units are performed. Through the cooperative optimization algorithm, the control strategy is dynamically adjusted based on real-time feedback data from the operation units. Coordination and consistency among the operation units are ensured. Overall operation efficiency and quality are improved.

The step S6 specifically includes the following steps S61 through S63.

In the step S61, the operation status data collected in real time by the data acquisition module is received by the feedback control module. The operation status data includes a suspension height $H_{actual}$, a pressure of the hydraulic system $P_{actual}$, and an operating speed $V_{actual}$.

In the step S62, the operation status data are subjected to preliminary preprocessing by the feedback control module to obtain preliminarily preprocessed actual operation status data, thereby ensuring data accuracy and stability. The preliminary preprocessing includes data filtering, noise reduction, and data calibration to eliminate sensor errors and environmental interference.

In the step S63, the preliminarily preprocessed actual operation status data is compared with the control parameters in the preliminary control strategy generated by the intelligent decision-making module to identify deviations between the preliminarily preprocessed actual operation status and the control parameters in the preliminary control strategy.

A suspension height deviation ΔH is calculated as per the following formula:

$$\Delta H = H_{expected} - H_{actual}$$

where $H_{expected}$ represents an expected suspension height generated by the intelligent decision-making module, $H_{actual}$ represents an actual suspension height.

A hydraulic pressure deviation ΔP is calculated as per the following formula:

$$\Delta P = P_{expected} - P_{actual}$$

where $P_{expected}$ represents an expected hydraulic pressure generated by the intelligent decision-making module, and $P_{actual}$ represents an actual hydraulic pressure.

An operating speed deviation ΔV is calculated as per the following formula:

$$\Delta V = V_{expected} - V_{actual}$$

where $V_{expected}$ represents an expected operating speed generated by the intelligent decision-making module, and $V_{actual}$ represents an actual operating speed.

Through the above steps, the operation status data are received and processed in real time by the feedback control module. The deviations between the preliminarily preprocessed actual operation status for the electro-hydraulic suspension system and the control parameters in the preliminary control strategy are accurately identified. A deviation value of each parameter is calculated to precisely determine the control parameters requiring adjustment. The operation status of the electro-hydraulic suspension system is maintained in alignment with the optimal control strategy.

The step S7 specifically includes the following steps S71 through S74.

In the step S71, deviation data calculated by the feedback control module is received by the intelligent decision-making module. The deviation data includes the suspension height deviation ΔH, the hydraulic pressure deviation ΔP, and the operating speed deviation ΔV.

In the step S72, the deviation data is analyzed by the intelligent decision-making module. Trends and potential causes of the deviations are determined. The specific analysis is as follows.

Trend analysis is performed on the deviation data to determine whether the deviation is temporary or persistent.

Potential deviations caused by environmental changes and operating condition variations are analyzed based on the historical data from the operation task database and current environmental data.

In the step S73, based on the trends and the potential causes of the deviations, the preliminary control strategy is dynamically adjusted by the intelligent decision-making module using an adaptive adjustment algorithm to obtain updated control parameters. Specifically, when the deviation is persistent, a corresponding control parameter is adjusted to reduce the deviation. When the deviation is temporary, the corresponding control parameter is monitored and recorded without immediate parameter adjustment to prevent over-correction. The dynamic adjustment is performed by using a proportional-integral-derivative (PID) control algorithm to perform parameter correction.

The suspension height is adjusted as per the following formula to obtain an updated suspension height:

$$H_{new} = H_{expected} + K_p \cdot \Delta H + K_i \cdot \int \Delta H dt + K_d \frac{d\Delta H}{dt}$$

The hydraulic pressure is adjusted as per the following formula to obtain an updated hydraulic pressure:

$$P_{new} = P_{expected} + K_p \cdot \Delta P + K_i \cdot \int \Delta P dt + K_d \frac{d\Delta P}{dt}$$

The operating speed is adjusted as per the following formula to obtain an updated operating speed:

$$V_{new} = V_{expected} + K_p \cdot \Delta V + K_i \cdot \int \Delta V dt + K_d \frac{d\Delta V}{dt}$$

In the above formulas, $H_{new}$, $P_{new}$ and $V_{new}$ respectively represent the updated suspension height, the updated hydraulic pressure and the updated operating speed, $H_{expected}$, $P_{expected}$ and $V_{expected}$ respectively represent the expected suspension height, the expected hydraulic pressure and the expected operating speed generated by the intelligent decision-making module, ΔH, ΔP and ΔV respectively represent the suspension height deviation, the hydraulic pressure deviation and the operating speed deviation, t represents a time variable, and $K_p$, $K_i$, and $K_d$ respectively represent a proportional coefficient, an integral coefficient, and a derivative coefficient of the PID controller.

In the step S74, the updated control parameters are transmitted to the cooperative operation module and the relevant operation units to ensure all of the operation units are operating in accordance with an updated control strategy.

Through the above steps, the intelligent decision-making module is capable of analyzing the trends and causes of the deviations based on the deviation data identified by the feedback control module, and dynamically adjusting the preliminary control strategy by using an adaptive adjustment algorithm. This dynamic adjustment mechanism not only enables timely responses to potential environmental and operating condition changes during the actual operation, ensuring that the operating state of the suspension system remains consistent with the optimal control strategy, but also improves the system's response speed and operating accuracy.

The disclosure encompasses any substitutions, modifications, equivalents, and alternatives made within the spirit and scope of the disclosure. In order to provide the public with a thorough understanding of the disclosure, specific details are set forth in the above specific embodiment. However, those skilled in the art may fully understand the disclosure without the description of these details. In addition, to avoid unnecessarily obscuring the essence of the disclosure, well-known methods, processes, procedures, components, and circuits have not been described in detail.

The above description is merely a specific embodiment of the disclosure. It should be noted that, for those skilled in the art, various modifications and improvements can be made without departing from the principles of the disclosure, and such modifications and improvements should also be considered within the scope of protection of the disclosure.

What is claimed is:

1. An intelligent collaborative operation control strategy for an electro-hydraulic suspension system of a high-horsepower tractor, comprising the following steps:

S1, establishing an operation task database, and defining control strategy parameters of the electro-hydraulic suspension system for different types of agricultural operation tasks in the operation task database;

S2, collecting, in real time via a data acquisition module, a position of the electro-hydraulic suspension system, an operating pressure of a hydraulic system, an actual operating speed of the high-horsepower tractor, terrain data and environmental information during an operation of the high-horsepower tractor to obtain real-time data, and storing the real-time data in a data storage unit;

S3, performing preprocessing, by a data processing module, on the real-time data stored in the data storage unit to generate a unified dataset, wherein the preprocessing comprises removing noise and abnormal data, and performing feature extraction and data fusion;

S4, analyzing, by an intelligent decision-making module based on machine learning algorithms, the unified dataset to generate a preliminary control strategy for the electro-hydraulic suspension system based on the control strategy parameters in the operation task database, wherein the preliminary control strategy comprises control parameters for a suspension height, a hydraulic pressure, and an operating speed;

wherein the step S4 comprises the following steps:

S41, receiving, by the intelligent decision-making module, the unified dataset;

S42, matching the unified dataset with the control strategy parameters in the operation task database to generate a matched dataset, thereby generating a target agricultural operation task;

S43, analyzing the matched dataset based on a random forest-based machine learning algorithm to determine target control parameters for the electro-hydraulic suspension system consistent with current operating conditions of the high-horsepower tractor; and S44, generating the preliminary control strategy for the electro-hydraulic suspension system based on the target control parameters, wherein the preliminary control strategy comprises the control parameters for the suspension height, the hydraulic pressure, and the operating speed to adapt to the current operating conditions of the high-horsepower tractor;

wherein the step S42 comprises the following steps:

S421, performing an initial match between the unified dataset and the control strategy parameters in the operation task database;

S422, calculating a different value between each parameter in the unified dataset and a corresponding control strategy parameter of the control strategy parameters in the operation task database as the following formula:

$$D_{ij} = |P_i - T_j|$$

where $D_{ij}$ represents a different value between an i-th parameter in the unified dataset and a j-th control strategy parameter of the control strategy parameters in the operation task dataset, $P_i$ represents a value of the i-th parameter in the unified dataset, and $T_j$ represents a value of the j-th control strategy parameter of the control strategy parameters in the operation task dataset;

S423, calculating a total difference for each of the different types of agricultural operation tasks to determine the target agricultural operation task as per the following formula:

$$D_j = \sum_{i=1}^{n} D_{ij}$$

where $D_j$ represents a total difference for a j-th agricultural operation task of the different types of agricultural operation tasks, and n represents a total number of the control strategy parameters of each of the different types of agricultural operation tasks;

S424, selecting an agricultural operation task with a minimum total difference from the different types of agricultural operation tasks as the target agricultural operation task as per the following formula:

$$j_{best} = \arg\min_j \{D_j\}$$

where $j_{best}$ represents an index of the target agricultural operation task with the minimum total difference Di, and argmin represents a minimum value function; and S425, using the control strategy parameters of the target agricultural operation task corresponding to the matched dataset as the preliminary control parameters;

wherein the step S43 comprises the following steps:

S431, constructing a training dataset comprising historical operating data and corresponding control parameters, wherein the training dataset comprises suspension heights, hydraulic pressures, operating speeds, and corresponding environmental conditions and operation results;

S432, training a random forest model using the training dataset to obtain a trained random forest model, wherein the random forest model consists of a plurality of decision trees, and each of the plurality of decision trees is constructed as per the following formula:

$$\text{Tree}(X) = \sum_{i=1}^{n} w_i \cdot h_i(X)$$

where Tree(X) represents a decision tree model, X represents an input feature vector, $h_i(X)$ represents an i-th decision tree, $w_i$ represents a corresponding weight of the i-th decision tree, and n represents a number of the plurality of decision trees;

S433, inputting the matched dataset obtained in the step S42 into the trained random forest model for prediction, and outputting, by the trained random forest model, the target control parameters by integrating prediction results from all the plurality of decision trees as per the following formula:

$$\hat{Y} = \frac{1}{N} \sum_{j=1}^{N} \text{Tree}_j(X)$$

where $\hat{Y}$ represents a predicted target control parameter vector, N represents a total number of the plurality of decision trees, and $\text{Tree}_j(X)$ represents a prediction result of a j-th decision tree of the plurality of decision trees; and S434, generating, by the trained random forest model, the control parameters for the electro-hydraulic suspension system based on the matched database, wherein the control parameters comprise the suspension height, the hydraulic pressure, and the operating speed;

S5, receiving, by a collaborative operation module, the preliminary control strategy generated by the intelligent decision-making module, and performing data interaction and collaborative control with operation units to ensure coordination and consistency among the operation units;

S6, receiving, by a feedback control module, operation status data collected in real time by the data acquisition module, and processing and analyzing the operation status data to identify deviations between the operation status data and the control parameters in the preliminary control strategy; and S7, dynamically adjusting, by the intelligent decision-making module, the preliminary control strategy based on the deviations identified by the feedback control module to respond to environmental changes and operating condition variations during an actual operation of the high-horsepower tractor.

2. The intelligent collaborative operation control strategy for the electro-hydraulic suspension system of the high-horsepower tractor as claimed in claim 1, wherein the step S1 comprises the following steps:

S11, classifying agricultural operation tasks into different types to obtain the different types of agricultural operation tasks, wherein the different types of agricultural operation tasks comprise plowing operation tasks, seeding operation tasks, and harvesting operation tasks;

S12, for each agricultural operation task, collecting relevant operation parameters and historical data, and organizing and standardizing the relevant operation parameters and the historical data to form the operation task database, wherein the operation parameters and the historical data comprise terrain characteristics, soil types, operating depths, operating speeds, and implement information;

S13, using, based on the historical data and the relevant operation parameters, statistical analysis and machine learning algorithms to determine the control strategy parameters of the electro-hydraulic suspension system for the different types of agricultural operation tasks, wherein the control strategy parameters comprise parameters for suspension heights, hydraulic pressures, and operating speeds; and S14, storing the control strategy parameters in the operation task database, and establishing a correspondence between the control strategy parameters and the different types of agricultural operation tasks for use during the actual operation of the high-horsepower tractor.

3. The intelligent collaborative operation control strategy for the electro-hydraulic suspension system of the high-horsepower tractor as claimed in claim 1, wherein the step S2 comprises the following steps:

S21, configuring the data acquisition module, the data acquisition module comprising a plurality of sensors, wherein the plurality of sensors comprise a position sensor, a pressure sensor, a speed sensor, a terrain scanner, and an environmental monitor; the position sensor is configured to monitor the position of the electro-hydraulic suspension system in real time; the pressure sensor is configured to monitor the operating pressure of the hydraulic system; the speed sensor is configured to record the actual operating speed of the high-horsepower tractor; the terrain scanner is configured to obtain the terrain data of a current operating region; and the environmental monitor is configured to collect the environmental information comprising a temperature and a humidity;

S22, transmitting, in real time via a data acquisition unit of the data acquisition module, data collected by the plurality of sensors to a central processing unit of the data acquisition module, wherein the central processing unit is configured to perform initial time-stamping and classification processing on the data collected by the plurality of sensors;

S23, implementing a data filtering algorithm during a data acquisition process to remove noise or abnormal data from the data collected by the plurality of sensors, wherein the data filtering algorithm comprises signal smoothing, outlier detection, and data normalization;

S24, storing data, after performing preliminary processing and verification, as the real-time data in the data storage unit; and S25, establishing a data index for the real-time data, wherein each data item of the real-time data is marked with a unique index and a corresponding operation task label, thereby enabling association of the data item with a corresponding agricultural operation task.

4. The intelligent collaborative operation control strategy for the electro-hydraulic suspension system of the high-horsepower tractor as claimed in claim 1, wherein the step S3 comprises the following steps:

S31, extracting the real-time data from the data storage unit, wherein the real-time data comprises the position of the electro-hydraulic suspension system, the operating pressure of the hydraulic system, the actual operating speed of the high-horsepower tractor, the terrain data and the environmental information;

S32, applying a data cleaning algorithm to the real-time data to remove the noise and the abnormal data, thereby obtaining cleaned data, comprising:

using a median filtering algorithm and a mean filtering algorithm to smooth the real-time data and eliminate instantaneous noise; and using a statistical analysis method to detect and remove the abnormal data;

S33, performing the feature extraction by analyzing the cleaned data to obtain features, wherein the features comprise a displacement change rate of the electro-hydraulic suspension system, a pressure fluctuation range of the hydraulic system, an instantaneous speed and an acceleration of the high-horsepower tractor, a terrain slope and a surface roughness, and variation trends of environmental temperature and humidity;

S34, performing the data fusion, comprising:

using a Kalman filtering algorithm to fuse multi-sensor data to obtain multi-dimensional feature data; and performing dimensionality reduction on the multi-dimensional feature data to reduce redundant data, thereby to form a comprehensive feature dataset; and S35, storing the comprehensive feature dataset in the data storage unit, and tagging the comprehensive feature dataset with a timestamp and a task label, thereby generating the unified dataset.

5. The intelligent collaborative operation control strategy for the electro-hydraulic suspension system of the high-horsepower tractor as claimed in claim 1, wherein the step S5 comprises the following steps:

S51, receiving, by the cooperative operation module, the preliminary control strategy generated by the intelligent decision-making module, wherein the preliminary control strategy comprises the control parameters for the suspension height Ĥ, the hydraulic pressure P̂, and the operating speed V̂;

S52, transmitting the preliminary control strategy to the operation units via an internal bus, wherein the operation units comprise a plowing unit and a seeding unit;

S53, receiving, by each of the operation units, the preliminary control strategy, and adjusting operation statuses of the operation units based on the control parameters of the preliminary control strategy;

S54, monitoring, by sensors of the cooperative operation module, the operation statuses and feedback data of the operation units in real time, wherein the feedback data comprises an actual plowing depth and an actual seeding speed;

S55, aggregating, by the cooperative operation module, the feedback data from the operation units to obtain aggregate data, and comparing the aggregate data with the preliminary control strategy to adjust the preliminary control strategy through a built-in cooperative optimization algorithm to obtain an adjusted control strategy, thereby ensuring the coordination and the consistency among the operation units; and S56, dynamically adjusting operation parameters of each of the operation units based on the adjusted control strategy to ensure the coordination and the consistency among the operation units during the cooperative operation.

6. The intelligent collaborative operation control strategy for the electro-hydraulic suspension system of the high-horsepower tractor as claimed in claim 1, wherein the step S6 comprises the following steps:

S61, receiving, by the feedback control module, the operation status data collected in real time by the data acquisition module, wherein the operation status data comprises a suspension height $H_{actual}$, a pressure of the hydraulic system $P_{actual}$, and an operating speed $V_{actual}$;

S62, performing preliminary processing, by the feedback control module, on the operation status data to obtain preliminarily preprocessed actual operation status data, wherein the preliminary processing comprises data filtering, noise reduction, and data calibration; and S63, comparing the preliminarily preprocessed actual operation status data with the control parameters in the preliminary control strategy generated by the intelligent decision-making module, to identify deviations between the preliminarily preprocessed actual operation status data and the control parameters in the preliminary control strategy;

wherein a suspension height deviation ΔH is calculated as per the following formula:

$$\Delta H = H_{expected} - H_{actual}$$

where $H_{expected}$ represents an expected suspension height generated by the intelligent decision-making module, and $H_{actual}$ represents an actual suspension height;

wherein a hydraulic pressure deviation ΔP is calculated as per the following formula:

$$\Delta P = P_{expected} - P_{actual}$$

where $P_{expected}$ represents an expected hydraulic pressure generated by the intelligent decision-making module, and $P_{actual}$ represents an actual hydraulic pressure;

wherein an operating speed deviation ΔV is calculated as per the following formula:

$$\Delta V = V_{expected} - V_{actual}$$

where $V_{expected}$ represents an expected operating speed generated by the intelligent decision-making module, and $V_{actual}$ represents an actual operating speed.

7. The intelligent collaborative operation control strategy for the electro-hydraulic suspension system of the high-horsepower tractor as claimed in claim 1, wherein the step S7 comprises the following steps:

S71, receiving, by the intelligent decision-making module, deviation data calculated by the feedback control module, wherein the deviation data comprises a suspension height deviation, a hydraulic pressure deviation, and an operating speed deviation;

S72, analyzing, by the intelligent decision-making module, the deviation data to determine trends and potential causes of deviations;

S73, dynamically adjusting, by the intelligent decision-making module, the preliminary control strategy based on the trends and the potential causes of the deviations using an adaptive adjustment algorithm to obtain updated control parameters, comprising:

in response to a corresponding deviation of the deviations being a persistent deviation, adjusting, by the intelligent decision-making module, a corresponding control parameter to reduce the corresponding deviation of the deviations;

in response to the corresponding deviation of the deviations being a temporary deviation, monitoring and recording, by the intelligent decision-making module, the corresponding deviation of the deviations without immediately adjusting the corresponding control parameter;

wherein the dynamically adjusting is performed by using a proportional-integral-derivative (PID) control algorithm to perform parameter correction, comprising:

adjusting the suspension height as per the following formula to obtain an updated suspension height:

$$H_{new} = H_{expected} + K_p \cdot \Delta H + K_i \cdot \int \Delta H dt + K_d \frac{d\Delta H}{dt}$$

adjusting the hydraulic pressure as per the following formula to obtain an updated hydraulic pressure:

$$P_{new} = P_{expected} + K_p \cdot \Delta P + K_i \cdot \int \Delta P dt + K_d \frac{d\Delta P}{dt}$$

updating the operating speed as per the following formula to obtain an updated operating speed:

$$V_{new} = V_{expected} + K_p \cdot \Delta V + K_i \cdot \int \Delta V dt + K_d \frac{d\Delta V}{dt}$$

where $K_p$, $K_i$ and $K_d$ represents a proportional coefficient, an integral coefficient and a derivative coefficient of a PID controller, respectively; and S74, transmitting the updated control parameters to the collaborative operation module and relevant operation units to ensure all of the operation units operating in accordance with an updated control strategy.

\*   \*   \*   \*   \*